Figure 1:
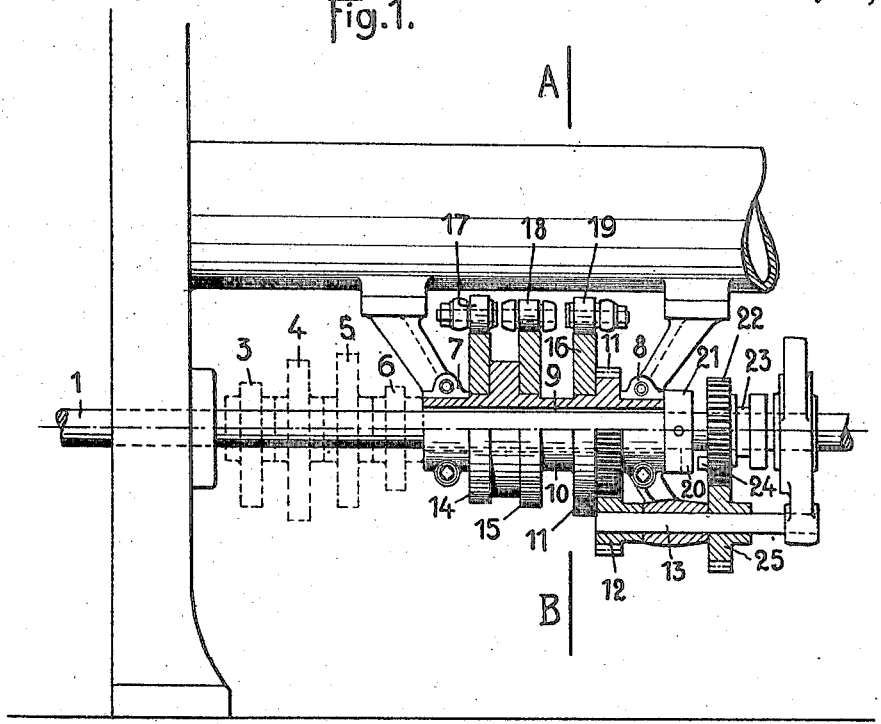

G. SIEBER.
DEVICE FOR DRIVING THE SCALLOP MECHANISM IN EMBROIDERING MACHINES.
APPLICATION FILED SEPT. 10, 1921.

1,416,894. Patented May 23, 1922.

UNITED STATES PATENT OFFICE.

GOTTWALT SIEBER, OF PLAUEN, GERMANY.

DEVICE FOR DRIVING THE SCALLOP MECHANISM IN EMBROIDERING MACHINES.

1,416,894.     Specification of Letters Patent.     Patented May 23, 1922.

Application filed September 10, 1921. Serial No. 499,859.

*To all whom it may concern:*

Be it known that I, GOTTWALT SIEBER, a citizen of the Republic of Saxony, Germany, residing at Plauen, in Saxony, Germany, have invented certain new and useful Improvements in Devices for Driving the Scallop Mechanism in Embroidering Machines, of which the following is a specification.

This invention relates to a device for driving auxiliary implements such as the scallop or a festoon mechanism in embroidering machines and has for its object to provide a simpler device than hitherto used. In the present embroidering machines such driving means which are set to action only from time are not placed on the main shaft of the machine, but situated on an auxiliary shaft adapted to be coupled with said main shaft, this especially being the case with the driving device of the scallop attachment.

This arrangement however has many drawbacks since the provision of a special auxiliary shaft requires both considerably more space and renders supervision and access to the mechanism when accidents happen difficult.

In the present invention all the drawbacks referred to are completely done away with by arranging the cam disks of the scallop attachment, which come into action only from time to time, around the axis of the main shaft that carries the other cam disks.

In the drawing an embodiment of my invention is illustrated.

Fig. 1 is partly a front view and partly a longitudinal section and

Figure 2:
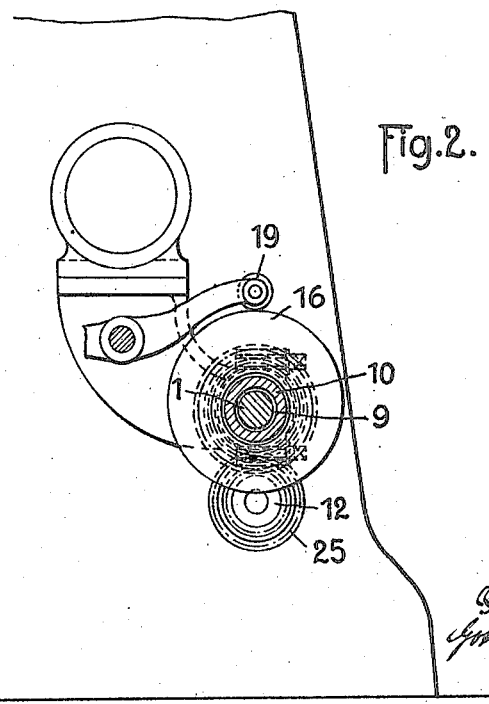

Fig. 2 a section on line A—B of Fig. 1.

Fixed in well known manner to the main shaft 1 of an embroidering machine are the cam disks for operating the principal tools, to wit the cam disks 3 for the needle movements, 4 and 5 for setting at work the first and second thread-guide and cams 6 and other cam disks, that may be required. These cam disks permanently partake of the rotation of the main shaft. Journaled in bearings 7, 8 is a sleeve 10 provided with an axial bore 9. This sleeve or hollow shaft 10 is provided with a gear 11 intermeshing with the pinion 12 of a speed reducing device 13. Fixed to the sleeve 10 is the cam disk 14 for lateral scallop movement, the cam disk 15 for the movement of the scallop thread guide and the cam disk 16 for the vertical movements of the scallop mechanism. The roller levers 17, 18, 19 transmit the movements received from the cam disks 14, 15, 16 respectively, in well known manner to the parts in connection with each roller lever. Rigidly connected to the main shaft 1 is a driver ring 21 provided with a recess 20; also arranged on the main shaft is a gear 22 adapted to be shifted axially by means of suitable shifting device (not shown) engaging the annular groove 23. The gear 22 is provided with a finger 24 adapted to engage the groove 20 of the driver ring 21 on axial movement of the gear 22 thereby transmitting the rotation of the main shaft 1 to the speed device, 25, 13, 12 and the sleeve 10 by means of the pinion 25 engaging the gear 22.

If the scallop mechanism is to be put out of action it only is necessary to shift the gear 22 axially so as to retract the finger 24 from the groove of the driver ring 20 and thus interrupt connection with the main shaft.

Having now fully described my invention I declare that what I claim is:

1. In an embroidering machine the combination with the main shaft, of means for driving auxiliary implements including a set of cams arranged co-axially with said main shaft and a speed reducing mechanism capable of being coupled to said shaft to transmit motion to said cams from said main shaft at a speed different from that of the latter.

2. In an embroidering machine the combination with the main shaft, of means for driving auxiliary implements including a hollow shaft mounted co-axially with said main shaft, a set of cams fixed to said hollow shaft for operating said implements, a speed reducing mechanism including a gear fixed to said hollow shaft and a second gear meshing with said first named gear and capable of being coupled to said main shaft so as to transmit motion from said main shaft to said hollow shaft.

In testimony whereof I affix my signature in presence of two witnesses.

GOTTWALT SIEBER.

Witnesses:
    JOSEPH MIHLE,
    REED E. FRICKE.